United States Patent
Ko et al.

(10) Patent No.: US 8,041,851 B2
(45) Date of Patent: Oct. 18, 2011

(54) GENERIC DMA MEMORY SPACE MAPPING

(75) Inventors: Wen-jeng Ko, Tucson, AZ (US);
Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 11/290,097

(22) Filed: Nov. 30, 2005

(65) Prior Publication Data
US 2007/0162638 A1 Jul. 12, 2007

(51) Int. Cl.
*G06F 13/28* (2006.01)
(52) U.S. Cl. ............................. 710/23; 710/22
(58) Field of Classification Search .............. 710/22, 710/23
See application file for complete search history.

(56) References Cited

U.S. PATENT DOCUMENTS

| | | | |
|---|---|---|---|
| 6,223,230 B1 | 4/2001 | Garnett et al. | |
| 6,311,234 B1 | 10/2001 | Seshan et al. | |
| 6,629,162 B1 * | 9/2003 | Arndt et al. | 710/28 |
| 6,665,759 B2 * | 12/2003 | Dawkins et al. | 710/200 |
| 2002/0124127 A1 | 9/2002 | Dawkins et al. | |
| 2003/0070011 A1 | 4/2003 | Naruse et al. | |
| 2005/0055470 A1 | 3/2005 | Arndt et al. | |
| 2005/0114560 A1 | 5/2005 | Coleman et al. | |
| 2006/0212673 A1 * | 9/2006 | Fukuguchi et al. | 711/173 |

* cited by examiner

*Primary Examiner* — Alford Kindred
*Assistant Examiner* — Farley Abad
(74) *Attorney, Agent, or Firm* — Dan Shifrin

(57) ABSTRACT

In a data processing system having multiple input/output adapters, a DMA memory block is assigned to each adapter. The DMA memory block has a data area and a generic common control area. All adapters have the same translation control entry for the control area. The control area includes a mapped page assigned to each adapter request and an unmapped buffer space interposed between the mapped pages. By mapping the generic DMA memory, memory space which is not required by an adapter is not mapped unnecessarily. Because the generic DMA memory space is part of each adapter's DMA memory space, adapters are unable to write to partitions to which they do not belong and the possibility of cross-partition memory writes is reduced. Moreover, runaway writes to dedicated DMA memory space may be caught as soon as they occur.

14 Claims, 3 Drawing Sheets

GENERIC DMA MEMORY SPACE MAPPING

TECHNICAL FIELD

The present invention relates generally to data processing systems and, in particular, to effectively managing DMA memory space.

BACKGROUND ART

In high-end data processing systems, such as data storage subsystems, host adapters interconnect the system with host units (either directly or through a network or fabric) and device adapters interconnect the system with various peripheral devices, such as disk arrays. SMP (symmetric multiprocessing) is commonly used to manage multiple CPUs in multi-processor systems. The processors in an SMP managed system access common memory and input/output (I/O) resources. DMA (direct memory access) is a commonly used function which allows peripheral devices to exchange data without tying up the CPU.

In current designs, contiguous DMA memory is mapped for all adapters to access the SMP memory space. And, while such a method provides a common control area which is accessible to all adapters, current designs have numerous drawbacks. First, the entire generic (common) DMA memory space is mapped. Consequently, space which should remain unmapped is exposed to improper writes by adapters. Second, the entire space is mapped in a single operation. Consequently, it is difficult to halt "runaway" memory writes as they occur. And, third, because the entire generic DMA memory space is mapped for all adapters on a system platform, any adapter may write to any partition in a multiple partition platform and cross-partition memory writes may not be preventable.

Consequently, a need remains for effective DMA mapping which overcomes the foregoing drawbacks.

SUMMARY OF THE INVENTION

The present invention provides a data processing system having multiple input/output adapters in which a DMA memory block is assigned to each adapter. The DMA memory block has a data area and a generic common control area. All adapters have the same translation control entry for the control area. The control area includes a set of mapped pages assigned to each adapter request and an unmapped buffer space interposed between the mapped pages.

In a method of the present invention, an IML of a data processing system with multiple adapters is initiated. A DMA memory block is allocated to each of the adapters and a data area and a control area are assigned within each DMA memory block. A request is received from SMP components during the IML for DMA memory space and a set of pages is mapped within the control area of SMP memory space for the adapter request. A space is also preferably reserved following the mapped page as an unmapped buffer.

By mapping the generic DMA memory for all adapters in the same LPAR (Logical Partition), memory space which is not required by adapters is not mapped unnecessarily. Because the generic DMA memory space is part of each adapter's DMA memory space, adapters are unable to write to partitions to which they do not belong and the possibility of cross-partition memory writes is reduced. Moreover, runaway writes to dedicated DMA memory space may be caught as soon as they occur.

DETAILED DESCRIPTION OF THE PREFERRED EMBODIMENT

Figure 1:
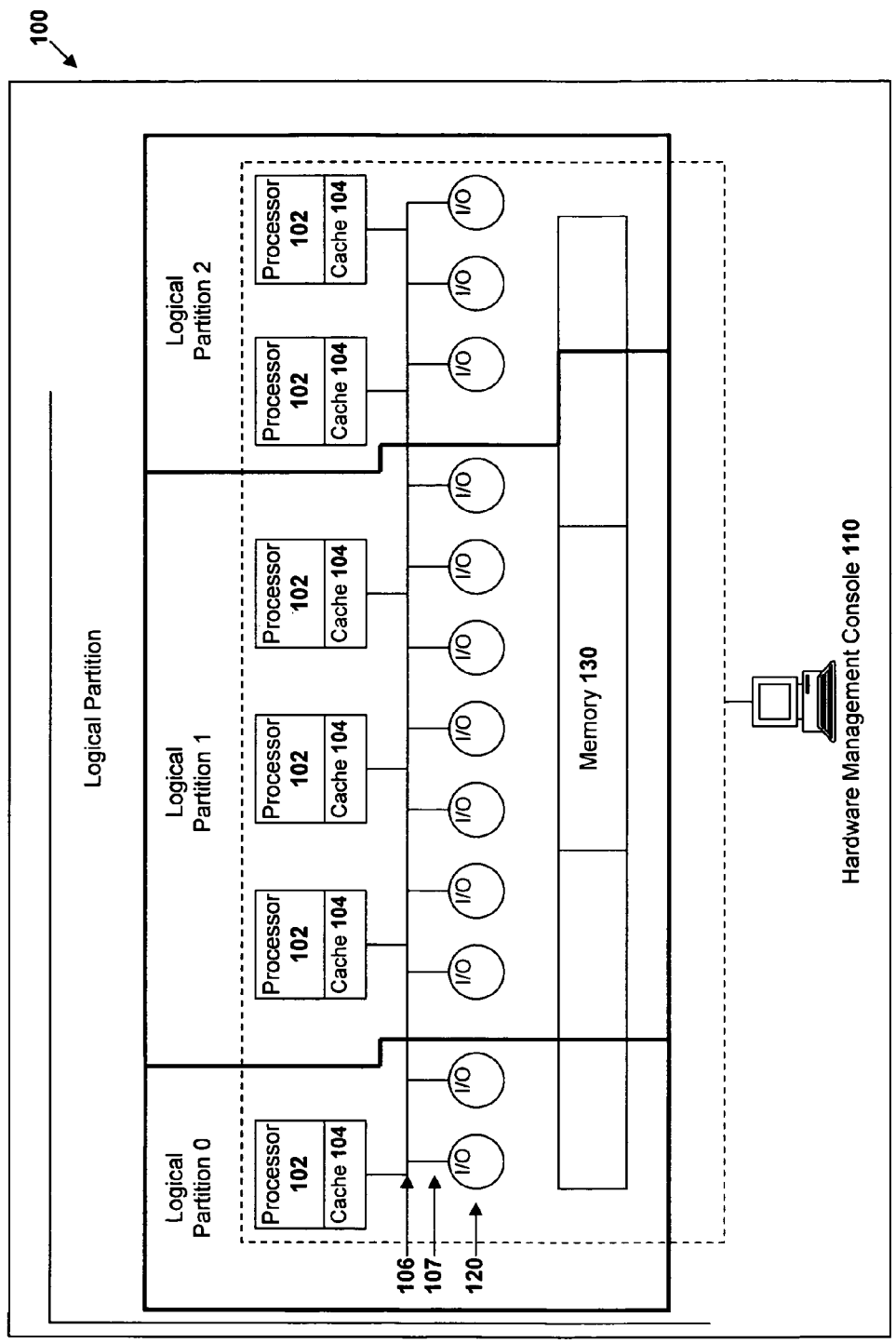
FIG. 1 is a block diagram of a multi-partition storage system in which the present invention may be implemented.

Although the present invention is described herein as being implemented in a data storage system, such a description is for illustrative purposes only and is not meant to limit the scope of the invention in any way. FIG. 1 is a block diagram of a storage system 100 which has been partitioned into three partitions, LPAR 0, LPAR 1, and LPAR 2. The system 100 includes processors 102 with associated cache 104. A primary bus 106 interconnects the processor 102 and cache 104, peripheral devices (not shown in FIG. 1) through input/output (I/O) adapters 120, and memory 130. The adapters 120 are physically connected with the bus 106 through adapter slots 107. Each partition includes one or more processor/cache combinations 102/104 and I/O adapters 120 and a portion of the memory 130 and can operate as an independent storage subsystem with separate resources. A system administrator may interact with the system 100 through a management console 110.

Figure 2:
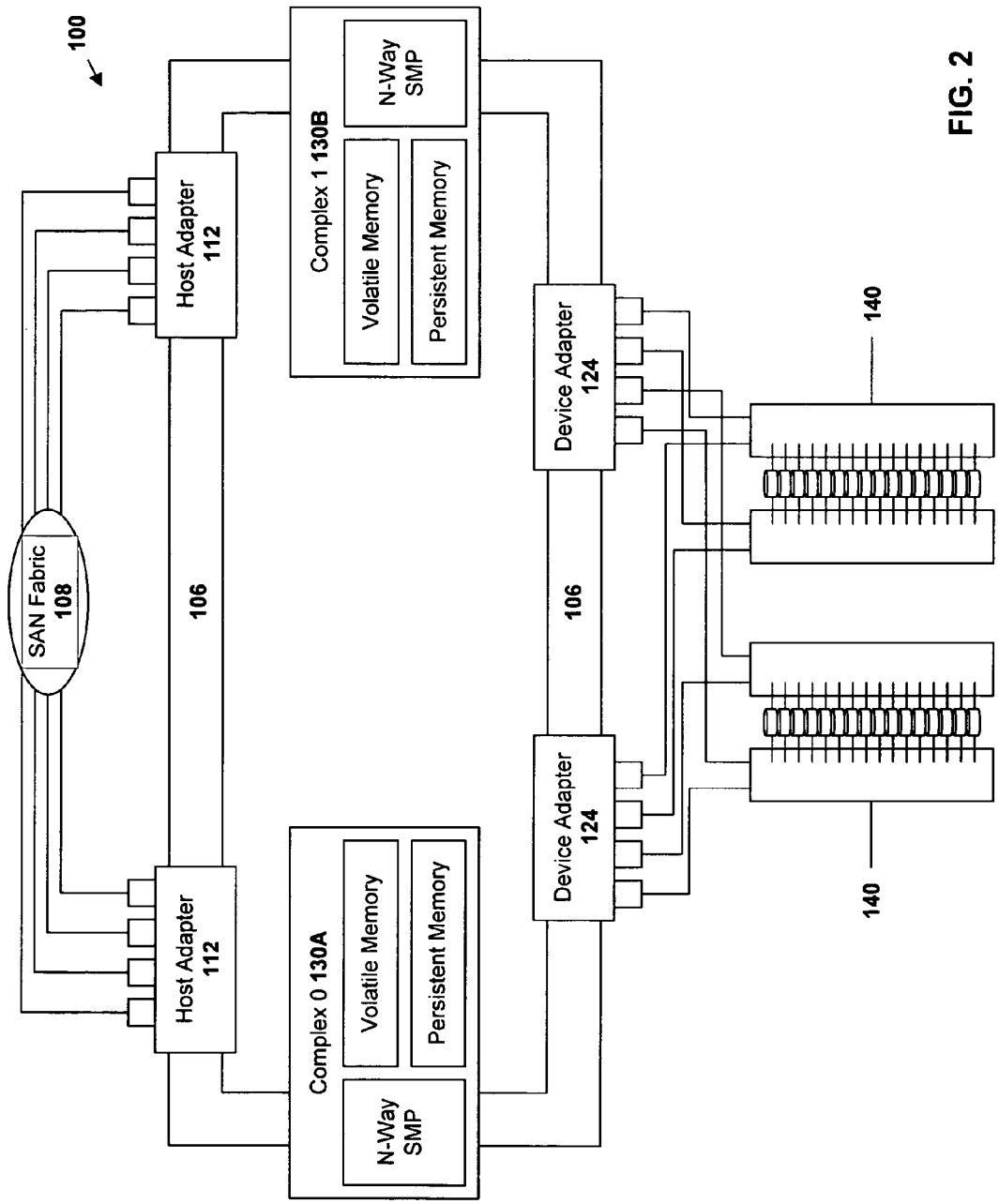
FIG. 2 is another block diagram of the storage system in which the present invention may be implemented.

FIG. 2 is another block diagram of the storage system 100 in which host adapters 122 interconnect the bus 106 of the storage system 100 with host units through a storage area network (SAN) 108. Other adapters 124 interconnect the bus 106 with disk storage arrays 140 through redundant switches.

The memory 130 includes a direct memory access (DMA) memory space, divided into a control area and a data area. The present invention associates the control area (also referred to as generic or common DMA memory) with each adapter slot 107 and maps sets of pages in the control area to SMP memory. The mapping is the same for all adapters; thus, each adapter writes to the same offset within its DMA allocation, thereby accessing the same physical memory location in the SMP space. Additionally, the present invention preferably provides an unmapped buffer space between each mapped control area space.

Figure 3:
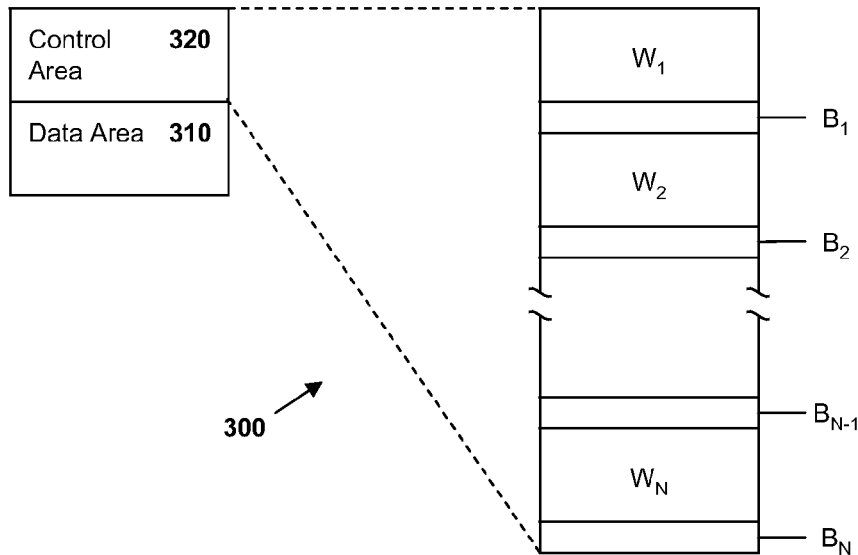
FIG. 3 schematically represents one DMA memory space mapped in accordance with the present invention.

By way of example and not limitation, the present invention may be implemented on products developed and sold by International Business Machines Corporation such as the DS6000/DS8000 family of DASD storage systems. In such systems, each adapter is assigned two 256 Mbyte DMA address spaces, each 256 Mbyte space being associated with one of two clusters. As illustrated in FIG. 3, each 256 Mbyte DMA address space 300 is divided into a data area 310 and a control area 320. The data area 310 is configured to hold information being exchanged among devices. Space in the control area 320 is used to communicate information between adapters and the SMP system and is allocated among N adapter requests $W_1, W_2, \ldots, W_N$. In the illustration, the control area 320 is assigned to the first 112 Mbyte space in the DMA memory space 300 with the data area being assigned to the remaining 144 Mbytes and mapped spaces are multiples of 4 Kbyte pages. However, it will be appreciated that other divisions of the DMA memory space 300 may be made. By mapping the generic DMA memory, memory space which is not required by adapter is not mapped unnecessarily. In a multi-partition platform, each adapter belongs to one partition. Therefore, because the generic DMA memory space is part of each adapter's DMA memory space, adapters are unable to write to partitions to which they do not belong and the possibility of cross-partition memory writes is reduced.

Additionally, the mapped spaces $W_1, W_2, \ldots, W_N$ are preferably protected by unmapped space $B_1, B_2, \ldots, B_N$ interposed therebetween to catch runaway writes to dedicated DMA memory space as soon as they occur.

Figure 4:
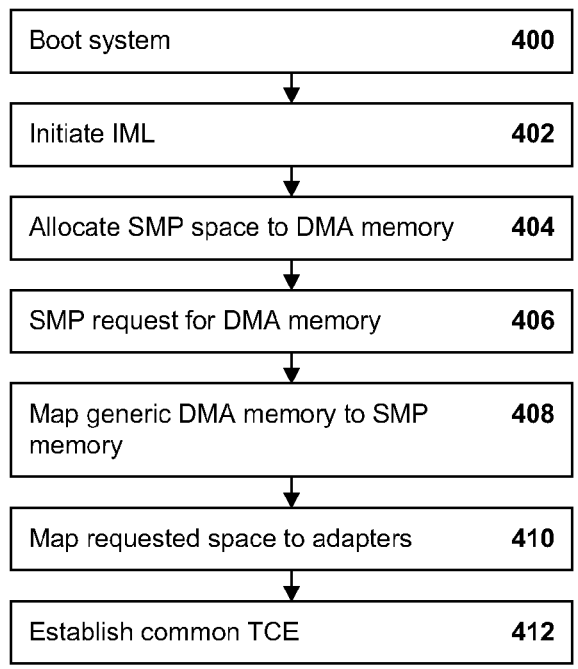
FIG. 4 is a flowchart of a mapping method of the present invention.

FIG. 4 is a flowchart of a mapping method of the present invention. The storage system, such as a DS6000 or DS8000, is booted (step 400), and initiates an initial microcode load (IML) (step 402). During the IML, a portion of the SMP memory space is allocated to DMA memory (step 404). When requested by the SMP code (step 406), the generic DMA memory on the top of DMA memory is mapped to physical SMP memory for all adapters (step 408). An adapter's DMA memory space is mapped to the SMP memory by establishing a translation control entry (TCE) for each page within the mapped space (step 410). Thus, each adapter writes to the same offset inside its allocated DMA space and uses the same physical memory location in SMP memory. Preferably, a 4 Kbyte page at the end of each mapped space is unmapped or left unmapped (step 412) to serve as a buffer space between mapped DMA memory spaces.

When a new adapter is added to the system, the generic DMA memory areas will be mapped for the new adapter. When an adapter is removed from the system, its generic DMA memory areas will be unmapped. Thus, preferably, allocation of generic DMA memory space is static in order to reduce the risk of having to rearrange the entire generic DMA memory space when adapters are added or removed would require.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type storage media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for mapping generic DMA memory in a data processing system.

What is claimed is:

1. A system for mapping generic DMA (direct memory access) memory in a data processing system, comprising:
   a plurality of logical partitions;
   a plurality of input/output adapters, each assigned to one of the plurality of logical partitions;
   SMP (symmetric multiprocessing) memory;
   a DMA memory block within the SMP memory assigned to each of the plurality of adapters;
   a data area within each DMA memory block; and
   a control area within each DMA memory block, all adapters having the same translation control entries for the control area of the assigned DMA memory blocks by which all adapters access the same physical memory location in the SMP memory, each control area comprising:
   a plurality of pages mapped to SMP memory, each assigned to an adapter request; and
   an unmapped buffer space interposed between each mapped page.

2. The system of claim 1, wherein each unmapped buffer space comprises 4 Kbytes of memory.

3. The system of claim 1, wherein each DMA memory block comprises 256 Mbytes.

4. The system of claim 3, wherein the control area comprises a first portion of each DMA memory block.

5. A method for mapping generic DMA (direct memory access) memory in a logically partitioned data processing system having multiple input/output adapters, the method comprising:
   initiating an IML (initial microcode load) of the data processing system;
   allocating a DMA memory block to each of the adapters;
   assigning a data area within each DMA memory block;
   assigning a control area within each DMA memory block;
   providing all adapters with the same translation control entries for the control area of the assigned DMA memory blocks by which all adapters access the same physical memory location;
   receiving a request from SMP (symmetric multiprocessing) for generic DMA memory space;
   assigning a set of pages within the control area to the request;
   mapping the assigned pages to an SMP memory; and
   reserving a space following the assigned pages as an unmapped buffer.

6. The method of claim 5, wherein mapping a page within the control area comprises establishing a translation control entry for the page.

7. The method of claim 5, wherein each unmapped buffer space comprises 4 Kbytes of memory.

8. The method of claim 5, wherein each DMA memory block comprises 256 Mbytes.

9. The method of claim 8, wherein the control area comprises a first portion of each DMA memory block.

10. A computer program product of a computer readable medium usable with a programmable computer, the computer program product having computer-readable code embodied therein for mapping generic DMA (direct memory access) memory in a logically partitioned data processing system having multiple input/output adapters, the computer-readable code comprising instructions for:
   initiating an IML (initial microcode load) of the data processing system;
   allocating a DMA memory block to each of the adapters;
   assigning a data area within each DMA memory block;
   assigning a control area within each DMA memory block;
   providing all adapters with the same translation control entries for the control area of the assigned DMA memory blocks by which all adapters access the same physical memory location;
   receiving a request from SMP (symmetric multiprocessing) for generic DMA memory space;
   assigning a set of pages within the control area to the request;

mapping the assigned pages to an SMP memory location; and reserving a space following the assigned pages as an unmapped buffer.

11. The computer program product of claim 10, wherein the instructions for mapping a page within the control area comprise instructions for establishing a translation control entry for the page.

12. The computer program product of claim 10, wherein each unmapped buffer space comprises 4 Kbytes of memory.

13. The computer program product of claim 10, wherein each DMA memory block comprises 256 Mbytes.

14. The computer program product of claim 13, wherein the control area comprises a first portion of each DMA memory block.

* * * * *